United States Patent Office 2,947,285
Patented Aug. 2, 1960

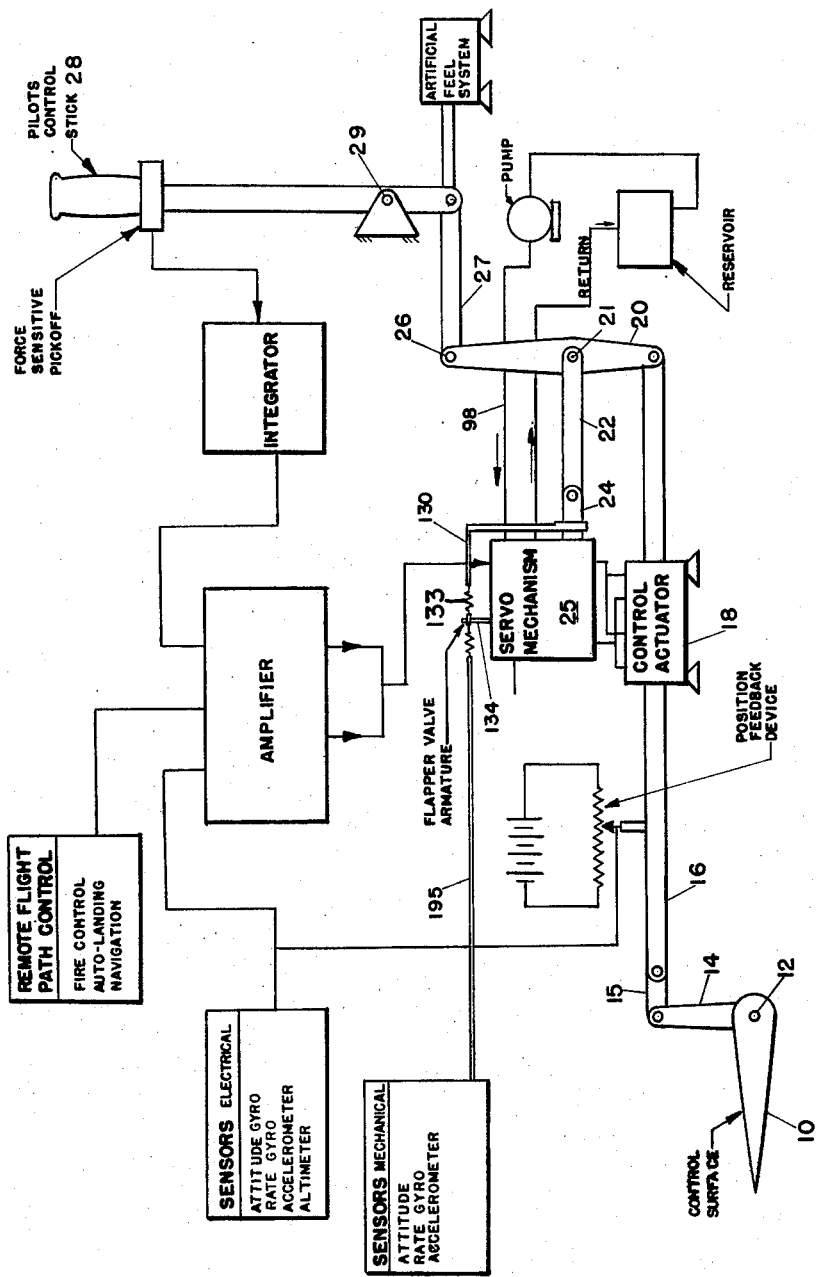

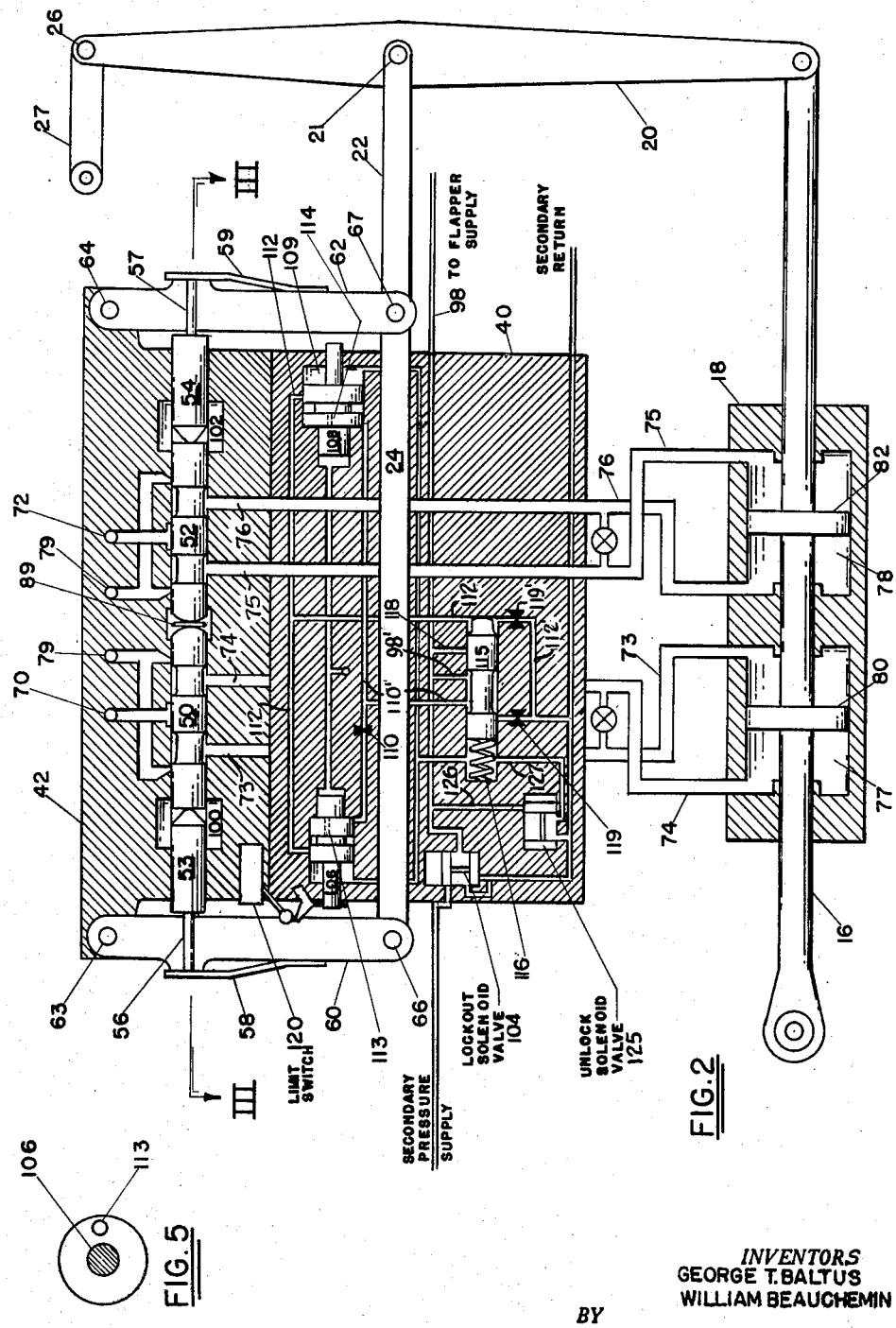

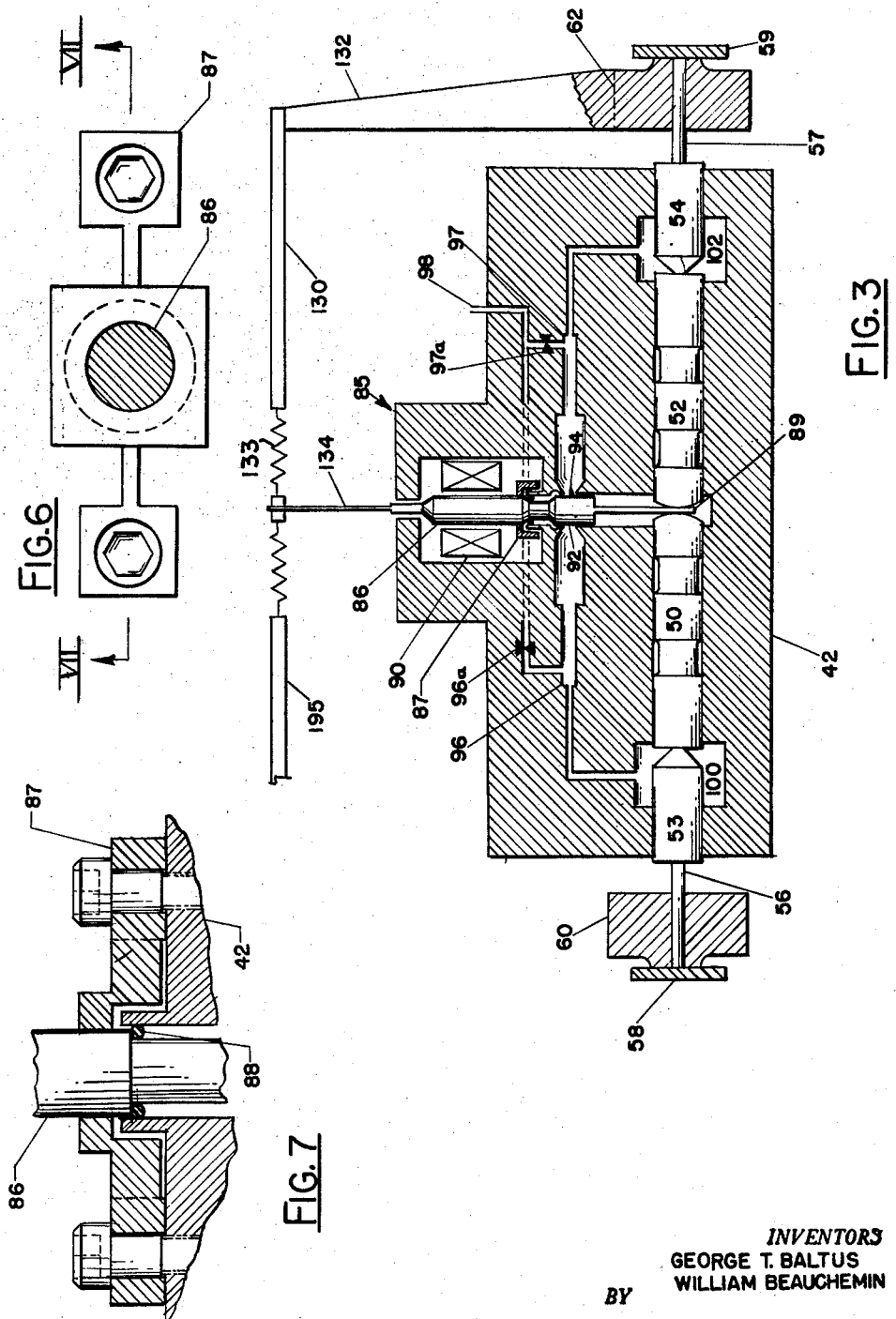

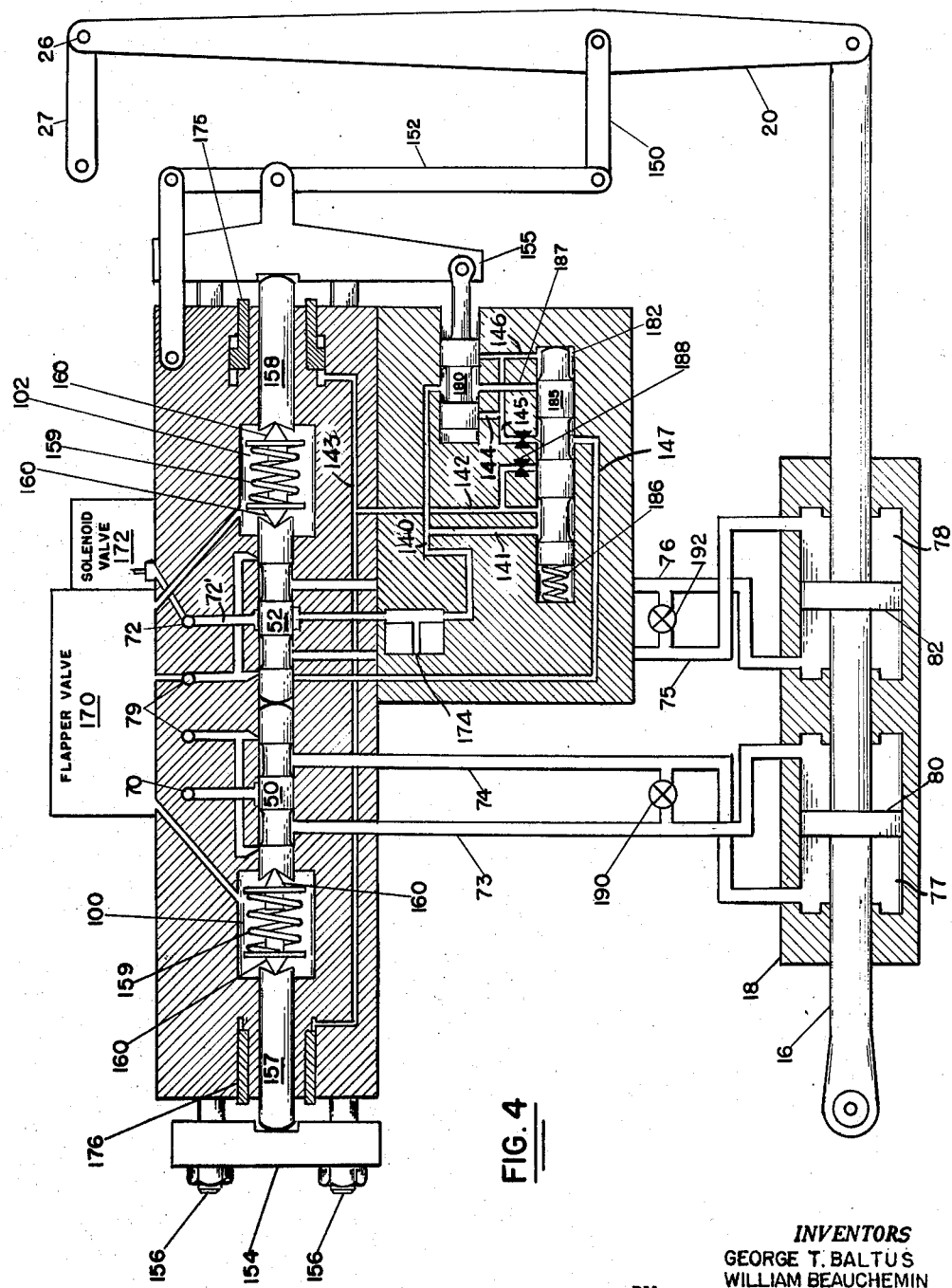

2,947,285

MANUAL AND AUTOMATIC HYDRAULIC SERVOMECHANISM

George T. Baltus, Tonawanda, and William Beauchemin, North Tonawanda, N.Y., assignors to Bell Aerospace Corporation Filed Mar. 20, 1957, Ser. No. 647,255

6 Claims. (Cl. 121—41)

This invention relates to aircraft control systems and the like, of the types employing combinations of hydraulic, mechanical and electrical components; and more particularly to improvements in servo mechanisms in hydraulic control systems such as are shown for example in co-pending application Serial No. 620,825, filed Nov. 7, 1956, by Harold K. Fletcher et al.

Current designs of control systems for high performance aircraft have tended toward fully hydraulic powered systems. These systems are basically irreversible in that the pilot feels none of the air load forces from the control surface, and therefore an artificial feel device is usually added to furnish a normal proportional force reaction at his control stick or pedals. Also, an ever increasing emphasis is currently noted toward automatic aircraft control, not only for the usual autopilot functions of holding a set course and altitude, but also for such flight path control purposes as to assist in fire control, automatic landing and navigation. A still further requirement has materialized, calling for means of augmenting the basic airframe stability during certain airspeed ranges. The conventional method of coupling a flight path control system to the aircraft's power control system has been to connect a positional servo motor to the pilot's control linkage, thereby paralleling the pilot's actuation of his power control valve. This type system is defined as a parallel type autopilot, and the conventional method of effecting augmentation has been to insert a differential actuator in series with the pilot's control linkage, thereby superimposing short term stabilizing control movements upon the pilot's long term positional reference. This differential action is intended to reflect a minimum of the transient control forces back to the pilot's stick or pedals.

These prior control coupling methods have several inherent disadvantages. With the parallel type autopilot the response requirements of the servo motor have become quite high, which demands a fairly powerful and high performance servo motor. Thus a unit weighing 6 to 8 pounds is required for the principal purpose of driving the pilot's stick or pedals at the accelerations needed for airframe stability. Although the differential actuator type of control does not have to drive as large an inertia as the parallel actuator, its response requirements under certain conditions may be even higher than those of the parallel actuator. In some cases this has required the use of a hydraulic servo. Thus, in such systems requiring autopilot and stabilization, there are three separate mechanisms for achieving the required control; the power valve actuator, the parallel actuator, and the differential actuator. The over-all weight and complexity penalties are very substantial.

An object of the present invention is to provide an improved means for meeting the above control requirements comprising a self-contained mechanism which actuates the power valve spools directly through application of control pressures at the ends of the same, and which utilizes a negligible amount of power from the main control actuator to perform the task of driving the control linkage and stick (or pedals) so as to follow the control movements in autopilot mode of operation. A means is included for decoupling the power spools from the restraining inertia of the control stick (or pedals) and linkage, and the mechanism incorporates an improved differential linkage and feed-back means for operation in the stabilization or damper mode of operation.

Otherwise stated, the invention provides an improved integrated autopilot servo valve and power control valve mechanism, for aircraft control systems or the like; and incorporates features providing for mechanical override of the electrical input signals during autopilot operations while functioning as a power control mechanism supplementing the pilot's manual control. Another feature of the mechanism of the invention is that it includes improved means insuring synchronized "cut-in" and "cut-out" of the autopilot without restriction against transfer of the controls from autopilot to the pilot manual control modes of operation.

It is a particular feature of the present invention that the autopilot and power control functions of the devices are combined into one basic controller, whereby the device requires only one actuator, such as for example the conventional hydraulic cylinder-piston or jack device. Hence, one valve mechanism is enabled to perform the functions usually accomplished by two sets of controls; one for power mode, to position the control surface; and one for autopilot mode, to move the control stick and linkage actuating the control surface. Hence, the mechanism of the invention is more compact; mechanically simplified; much lighter in weight and size; less expensive; and generally of less mechanical complexity and of improved overall reliability. Also, the electrical power requirement for the mechanism of the present invention when operating in the autopilot mode are appreciably reduced; and improved autopilot performance in terms of response is obtained, because of the greatly decreased inertia of the servo mechanism moving parts as compared to that of the conventional control stick and linkage in the parallel type autopilot control system. Other features and advantages of the invention will be apparent from the disclosure in the specification and the accompanying drawing wherein the invention is shown as being embodied in the mechanism for control of aircraft aerodynamic surfaces; although it will be understood that the invention may be applied to other uses with equal facility.

When the mechanism of the instant invention is operated in the power control mode, manual manipulation of the pilot's control stick varies the position of valve spools controlling the flow of hydraulic fluid to the cylinder of an hydraulic actuator, which latter supplies the requisite power. In the autopilot mode of operation, the pilot's control stick is uncoupled from the valve spools which then respond to movement of a flapper valve under the control of electrical input signals. In the stability augmentation mode of operation, the valve spools are positioned in response to both the flapper valve and the pilot's control stick, with the former being subject to a feed back torque force returning the valve spools to their null position.

In the drawing:

Fig. 1 is a schematic diagram of an aircraft control system embodying features and components of this invention;

Fig. 2 is a schematic sectional view of the servo and actuator mechanism components of the system of Fig. 1;

Fig. 3 is a section taken along lines III—III of Fig. 2;

Fig. 4 is a view corresponding to Fig. 2, but of a modified form of servo mechanism of the invention;

Fig. 5 is a section taken though a lockout piston component of the mechanism of Fig. 2;

Fig. 6 is a fragmentary sectional view of a component of the construction of Fig. 3; and Fig. 7 is a fragmentary section taken along line VII—VII of Fig. 6.

Referring now to Fig. 1 of the drawing, the invention is illustrated therein as being applied to control of an aircraft movable aerodynamic surface 10, such as an elevator. It will of course be appreciated that the invention may be similarly applied by any appropriate linkage or the like to the control of other aircraft movable surfaces, such as ailerons, rudders, or the like. The control surface 10 is pivoted as indicated at 12 to the aircraft and is adapted to be swung about said pivot by means of lever arm 14 extending rigidly therefrom. A push-pull control rod for actuating the control surface 10 is illustrated at 15, and pivotally connects to one end of the piston rod 16 of a power control cylinder 18. The rod 16 extends through the cylinder 18 and pivotally connects at its other end to a lever 20 which is pivoted as at 21 to a push-pull rod 22 pivotally connecting to a control rod 24 extending through the servo mechanism component of the control system as indicated generally at 25.

The lever 20 also pivotally connects as indicated at 26 to a link 27 extending into pivotal connection with the bottom end of the pilot control stick 28 which pivotally mounts upon the aircraft frame as indicated at 29. Thus it will be appreciated that the control system of Fig. 1 provides for direct hydro-mechanical control of the aerodynamic surface 10 in response to manual manipulations of the pilot control stick 28; as well as autopilot control of the aerodynamic surface through the servomechanism, as will be explained more fully hereinafter; as well as direct manual control of the aerodynamic surface whereby manual manipulations of the pilot control stick directly position the control surface without benefit of hydraulic power. Fig. 1 illustrates schematically various accessory components such as may be employed in conjunction with the servomechanism 25 when the system is operating in the autopilot mode.

Thus, for example as shown herein, the accessory components may include autopilot flight path and stabilization position and rate gyros; accelerometers; an altimeter; mechanical sensors; remote flight path control gyros, and the like. Also, as shown in Fig. 1, the system may conveniently include means whereby the pilot may override any action of the autopilot control system by means of a pilot stick force pick-off or transducer sensing the pilot's force input at the control stick 28 and integrating this force signal and adding it to the automatic flight path reference signal as a continuing bias to the reference signal. A signal feed back and artificial control reaction "feel" means are preferably added to the system, all as indicated schematically in Fig. 1.

The improved servomechanism of the present invention which enables the control system to fulfill the objects and advantages hereinabove set forth is indicated generally at 25 in Fig. 1; and is illustrated in greater detail in Figs. 2, 3, 6, 7. As shown therein, the servomechanism includes a pair of housing members designated generally at 40 and 42; both housings being conveniently fabricated of solid block metal stock and internally bored or cut out as shown in the drawing and as described hereinafter. The block 42 is longitudinally bored as shown in Figs. 2–3 to accommodate the "power valve" assembly comprising valve spools 50, 52 and push-rods 53—54, all in mutual alignment. The rods 53—54 connect to pins 56—57, respectively, which in turn bear at their outer ends against leaf springs 58—59 carried by corresponding links 60, 62. The links 60, 62 pivotally mount, as indicated at 63—64, upon the valve block 42 and pivotally connect at their swinging end portions as indicated at 66—67 to the control rod 22, 24 hereinabove referred to.

Thus, it will be appreciated that the members 24, 60, 62 provide a parallelogram type linkage adapted to be actuated mechanically in direct response to movement of the pilot control stick in such manner that the valve spools 50, 52 may be displaced longitudinally in alternative directions within the valve body. Such motions alternatively interconnect hydraulic power supply conduits 70, 72 with passageways 73, 74 and 75, 76, respectively, leading to corresponding chambers 77—78 within the actuator cylinder 18. The pressure supply return ports are indicated at 79—79. Pistons 80, 82 run in the chambers 77, 78 in response to application of pressure differentials at opposite sides thereof as furnished by the passageways 73—74—75—76, and are integrally coupled with the actuator rod 16 driving the aerodynamic surface 10 as hereinabove described.

The springs 58, 59 are preferably preloaded so that a threshold force of say 15 to 20 pounds (such as may be required to overcome any tendency of the valve spools to stick) may be applied against the pins 56, 57 and rods 53—54 before any relative displacement takes place between the valve spools and the links 60, 62. In event spool sticking develops such as requires forces in excess of the above mentioned preloading, one of the springs 59 will first be deflected until the corresponding link 62 moves into solid contact with the corresponding valve spool control rod 54. Limit spool forces may then be applied to clear the sticking. Thus, it will be appreciated that the mechanism is so arranged that in normal operation, movement of the pilot control stick will in turn cause the control rod 22, 24 to shift laterally as viewed in Fig. 2; and that this motion will in turn cause the valve spools 50, 52 to be displaced so as to open the hydraulic pressure system operating the control surface actuator 18 in the manner of a conventional manual control system.

Furthermore, it will be appreciated that the linkage system illustrated and described hereinabove will automatically "feed back" in a manner such as to null or center the power control valve spools when the actuator pistons have reached any new position as called for by the pilot's control movement. Thus, under normal pilot power control operation of the mechanism, any pressure applied to the pilot control stick will be reflected in operation of the parallelogram linkage, thereby causing hydraulic pressure to be applied to the control actuator 18 in such manner as to cause this actuator to follow up the input control movement of the power control stick, until such time as the spool valves 50, 52 are again nulled and the control is stationary at its new position. For example, assume that the pilot moves his control stick 28 to the left in Fig. 1. This causes link 27 to move to the right, Figs. 1 and 2, pivoting lever 20 clockwise about its pivot connection to piston rod 16. Such movement of lever 20 displaces control rod 22, 24 to the right, which in turn displaces spools 50, 52 to the right, thereby placing power supply conduits 70, 72 in communication with passageways 73 and 75, respectively, and placing passageways 74 and 76 in communication with return ports 79. This produces movement of pistons 80, 82 and piston rod 16 to the left, thereby power-shifting control surface 10 to the desired position indicated by the pilot through his control stick 28. Simultaneously, such movement of piston rod 16 to the left moves lever 20 clockwise about its pivot 26, displacing control rod 22, 24 to the left. This restoring action continues until spools 50, 52 have been moved to their centered or null position illustrated in the drawings, in which position communication with supply conduits 70, 72 and return ports 79 is shut off and pistons 80, 82 are held stationary. This control action is essentially irreversible with respect to any forces from the control load, insofar as they might otherwise be reflected back to the pilot control stick.

The servomechanism 25 also incorporates means for automatically positioning the aerodynamic control surface in response to electrical input signals from accessory sensing elements, such as a vertical gyro in a flight path control system. For this purpose, as illustrated in Fig. 3, a flapper valve device as indicated generally at 85 is provided to include an armature 86 carried by a torsion bar 87 (Figs. 3, 6, 7) adapted to function as a fulcrum for the armature 86 which is thereby rockable in alternate lateral directions as viewed in Fig. 3. As shown in Figs. 6, 7, the bar 87 is bolted firmly at its ends to the body 42 and armature 86 is rigidly mounted in its central apertured portion. An O ring 88 is mounted against a shoulder portion of the armature (Fig. 7) and the bore in the body 42 to fluid seal the section and to prevent oil from the nozzle area creeping into the coil cavity of the housing 85. From its nozzle end, a leaf spring 89 extends inwardly as shown in Figs. 2–3 to a position between the opposed ends of the valve spools 50, 52. An electromagnetic coil system as indicated at 90 is arranged to be selectively energized by means of input signals received from position and rate gyros or the like, through an amplifier as shown in Fig. 1, indicating positional and acceleration changes of the airframe as is well known in the aircraft flight control and/or stabilization art. The stem 89 is of flexible spring metal form, and thus it will be understood that in response to signals received by the windings 90 the armature 86 will be thereby caused to deflect toward and away from the opposite nozzles 92, 94 of a hydraulic pressure system comprising conduits 96, 97 controlled by metering orifices 96a, 97a receiving hydraulic pressure from a supply conduit 98 and having branch conduits leading to pressure chambers 100, 102 embracing the rods 53, 54, respectively.

Thus, it will be appreciated that opening of the pressure supply conduits to the chambers 100, 102, such as by opening of a pilot controlled "autopilot on" valve, will result in the application of hydraulic pressure forces in the chambers 100, 102 tending to displace the rods 53, 54 outwardly against the action of the corresponding springs 58, 59 until the rods 53, 54 seat and bear against their respective links 60, 62. In this condition, the armature 86 is now enabled to control movements of the valve spools 50, 52 in response to any variations of the pressure balance in the chambers 100, 102.

For example, if an electric signal as received by the valve coil 90 operates to cause the armature 86 to move toward the nozzle 94, the pressure in chamber 102 will rise with respect to the pressure in chamber 100; and as a result the valve spools 50, 52 will move toward the left as viewed in Fig. 3. This valve spool displacement produces a bending moment in the feed back spring 89 resulting in a torque fulcrumed in the bar 87 in opposition to the electrical torque applied to the armature 86, tending to center armature 86 and hence cause the chamber pressure differential to approach zero. As a further result, the spools 50, 52 have then assumed a displacement proportional to the input electric signal. The armature torque is several times greater than the hydraulic nozzle torque for full differential chamber pressure, and hence any frictional or sticking tendencies of the spool valves would be minimized by the action of this high gain hydraulic positioning loop. The spring rate of the member 89 determines the maximum spool displacement corresponding to a full input electric signal to the armature 86.

Thus, in order to convert the servomechanism to "autopilot" mode of operation for control of the valve spools 50, 52 in proportion to electrical signals received by the valve mechanism 85, the aircraft pilot simply closes an "autopilot engage" switch (not illustrated), which is coupled so as to thereby energize and open a lockout solenoid valve as indicated at 104 (Fig. 2) which controls flow of hydraulic pressure to the conduit 98 feeding the nozzles 92, 94 (Fig. 3). System pressure is thereby supplied to the flapper valve 86, and through passages 98' and 110' to a pair of lockout pistons 106, 108 (Fig. 2) thereby causing the latter to extend outwardly and into bearing contact with the links 60, 62, respectively. The linkage system is thereby restrained against any motion relative to the body of the mechanism in either direction, by a force equivalent to the system pressure times the effective area of the piston 106. The effective area of piston 108 is provided to be approximately twice that of the area of the piston 106, and the piston 108 seats against a shoulder portion 109 of the valve body when the piston is in extended position. Since the piston forces act in opposite directions, this arragement provides equal lockout forces referenced to one point only (the body shoulder 109), thereby minimizing temperature effects upon the electro-hydraulic null.

A restriction orifice as indicated at 110 in the passageway 110' intercommunicating the two lockout piston cylinders, insures that piston 108 will travel faster than the piston 106 and seat against the body shoulder 109 before the piston 106 has reached a corresponding position. This minimizes transient control disturbances such as would otherwise be troublesome as induced by the lockout action. The pistons 106, 108 are each provided as shown in Figs. 2 and 5 with bleeder ports 113, 114, respectively, for actuation of an override valve spool 115, referred to hereafter.

It is a particular feature of the autopilot mode of the servomechanism of the present invention, that the positioning of the valve spools 50, 52, as explained hereinabove is isolated from the restraining inertia of the control stick and its associated linkage. Hence, in effect, the control stick has been decoupled from the control valve permitting the latter to respond in optimum manner to autopilot electrical input signals. Thus, in a differential control arrangement embodying the servomechanism of the present invention, the control actuator provides the power used to move the control stick and linkage so as to follow up the movements called for by the autopilot. Preferably, the magnitude of the lockout force for any particular installation will be sufficient to accelerate the control stick against its inertia and friction at the maximum rate needed by the autopilot system, to satisfy its control response requirements. It will of course be appreciated that the acceleration forces react directly against the lockout pistons 106, 108.

In event it becomes necessary for the pilot to manually override the servomechanism while the latter is operating in autopilot mode, he readily accomplishes this simply by application of stick or rudder forces to the control linkage in excess of the hydraulic lockout described hereinabove. In so doing, a manual unlocking of the pistons 106, 108 is effected as follows: When the override force exceeds the lockout force and acts toward the left for example, piston 108 is forced toward the left. When the piston 108 has been so displaced it opens an override port to a passageway 112 (Fig. 2) prmitting pressure to be applied through passageways 110', 113—114 and 112 to the right hand end of an override control valve spool 115. This valve is normally biased to the right as shown in Fig. 2 by means of a compression spring 116; but as the pressure against the spool 115 builds, it moves toward the left against the spring until a full pressure port 118 is uncovered. This causes spool 115 to be hydraulically locked in its leftward biased position, and while in this position the lockout pressure line 98' to pistons 106, 108 is closed, while at the same time the system is opened so as to permit hydraulic pressure return through the orifice indicated as at 119. Thus, a gradual decay of the lockout force is effected, permitting a smooth transition to power control mode. The spring 116 is preloaded so that an intermediate hydraulic pressure is required for actuation of the override valve 115 to prohibit inadvertent operation during the lockout phase, and the right hand side of valve 115 is drained through passage 112', which can contain a restricted orifice 119', to prevent premature unlocking due to normal leakage.

When the lockout pressure has been lowered to its return level by the override action hereinabove described, both lockout pistons 106, 108 retract due to the differential areas thereof as acted upon by the return hydraulic pressure. A limit switch as indicated at 120, cam-operated incidental to movements of the piston 106 is thereupon opened, causing an electrical disengagement of the autopilot which thereupon deenergizes and closes the lockout solenoid valve 104. The mechanism has now been returned to power control mode of operation.

The servomechanism of the invention includes provision for operating under a stability augmentation mode, which takes effect when both lockout and unlock solenoid valves have been energized and opened; the unlock solenoid valve being indicated at 125 (Fig. 2) and serving, when energized, to supply hydraulic pressure to lockout pistons 106, 108 through passageways 126 and 127. The lockout pistons are thereby held in retracted positions because of their differential areas. As in the autopilot mode of operation, under this condition the flapper valve chamber pressure in chambers 100 and 102 causes the rods 53—54 to be pushed outwardly and into contact with their corresponding links 60, 62. The flapper valve is operated in response to the electrical signal. For example, if as in the autopilot mode, a magnet motor torque moves the armature 86 towards the nozzle 94, the valve spools 50, 52, will be displaced toward the left as viewed in Fig. 3 and the control actuator pistons will move toward the right. The lever 20 will then pivot about a point 26 for reasons to be explained hereinafter, and the linkage system comprising the members 22, 62 will be displaced toward the right.

A "feed back" arm as indicated at 130 (Fig. 3) extending from a bracket 132 integral with link 62 transmits a force back to the flapper valve mechanism 85 through means of an interconnecting spring system such as a coil spring 133 fixed to the outer end of an arm 134 extending from the armature 86. This force is proportional to the control surface displacement from the pilot's referenced position, and in a direction to oppose the input signal torque. The feed back torque transmitted through the arm 134 therefore acts to restore the chamber pressures interiorly of the mechanism so as to balance and to return the valve spools 50—52 to their null position. Hence, equilibrium will be achieved for a steady rate signal input when the torque developed about the diaphragm by the force of member 134 is equal and opposite to the electrical input signal torque. The lever 20 will pivot about the connection 26 because the feed back force from the member 134 plus the friction and the inertia of the parallelogram linkage and rods 53, 54 as reflected to the pivot point 26, is much less than that represented by the friction and inertia of the control stick linkage; hence the degree of stability augmentation authority or control travel will be determined by the full signal torque of the flapper valve, and by the member 134.

A modification of the power control mode of operation may be obtained by operating the mechanism as in the stability augmentation mode, as explained hereinabove while applying no electrical input. Hence the pilot's control is coupled to the flapper valve 85 instead of directly to the power valve spools 50, 52. Utilization of the flapper valve 85 as a pilot valve in this manner will appreciably reduce the undesirable spool friction and drift effects felt at the pilot's control, particularly under low temperature operating conditions.

Fig. 4 illustrates a modified form of servomechanism of the invention, such as may also be termed a multi-function controller for use in hydraulic control systems. It is basically a control valve adapted to function in either of three modes of operation such as may be defined as "power control"; autopilot mode; and damper mode. As in the case of the mechanism illustrated in Figs. 2, 3, the mechanism of Fig. 4 is illustrated as being operably connected to control an aerodynamic flight control surface push-pull rod 16 by means of an actuator 18; the push-pull member 16 being pivotally connected to a lever 20 which in turn pivotally connects at 26 to a pilot control stick linkage 27.

When operated in the power control mode, the servomechanism valve spools 50, 52 (corresponding to the similarly numbered valve spools of Fig. 2) are actuated by displacement of the pilot control stick links 150, 152 to cause opposed yokes 154, 155 (tied together by bolts 156—156) to displace the valve spools 50, 52 laterally through means of intermediate bearing rods 157, 158, and compression springs 159, 159 and adjacent fulcrum ends 160. For example, actuation of the mechanism so as to displace lever 150 toward the left from the position thereof shown in Fig. 4 causes rod 158 to compress its spring 159 slightly, and to thereupon displace the valve spools 50, 52 toward the left. In order to obtain maximum actuator velocity, the control displacement of the yoke 155 and the applied force must be sufficient to displace the valve spools 50, 52 a distance sufficient to obtain full openings of the pressure supply ports 70 and return ports 79 associated therewith. This movement of the valve spools with respect to the valve body will be accompanied by slightly greater movement of the yoke 155 due to compression of the right hand spring 159. The amount of this additional movement of the yoke 155 will be determined by the rate at which the pilot's control force builds up at the pilot control stick; and the amount of this force, and the duration of its application. In event sticking of the valve spools should develop, the pilot overcomes this simply by applying full forces to the control stick until the spools are freed subsequent to overcoming the compression force of the spring so that the inside ends of the associated fulcrum ends have bottomed.

When operated in the autopilot mode, positioning of the valve spools 50, 52 is controlled in proportion to electrical signals received by the flapper valve mechanism 170. The pilot first closes an "autopilot on" switch, thereby energizing and opening solenoid valves 172, 174. This causes system hydraulic pressure to be applied to the flapper valve 170 and also to lockout pistons 175, 176 (corresponding to the pistons 108, 106 of Fig. 2) through passageway 72′, valve 174 and passageways 140, 141, 142 and 143 thereby causing pistons 175, 176 to extend outwardly into contact with the corresponding yokes 155, 154. These yokes, and hence the connected control stick linkage, are then restrained to the body of the valve mechanism in both directions by a force equivalent to the system pressure times the area of piston 176. The area of piston 175 is made twice that of the area of piston 176, and piston 175 seats against a body shoulder when in its pressure-extended position. Because the forces of the pistons act in opposite directions this arrangement provides equal decoupling forces referenced to one point only (the body shoulder) thereby minimizing temperature effects upon the electro-hydraulic null. Hence, the flapper valve 170 is now enabled to control the position of the valve spools 50, 52 by varying the pressure balance in chambers 102, 100. This chamber pressure differential displaces the spools against the restoring force of the springs 159, 159. The maximum flapper valve differential pressure will be arranged to be sufficient to bottom the spring pins 160 under full flow conditions.

The essential feature of the autopilot mode of operation is that the positioning of the spools 50, 52 is isolated from the restraining inertia of the control stick and its associated linkage. Hence, it may be said that the control stick has in effect been decoupled from the control valve, permitting the latter to respond to autopilot electrical input signals. In a typical differential control arrangement employing the servomechanism of the present invention, the power control actuator provides the power used to move the control stick and linkage so as to follow up the movements called for by the autopilot.

The magnitude of the decoupling force for a particular system is arranged to be sufficient to accelerate the control stick against its inertia and friction at the maximum rate needed by the autopilot system to satisfy its control response requirements. These acceleration forces react directly against the decoupling pistons 175, 176. Should it become necessary for the pilot to manually override the servomechanism when set in autopilot mode, he readily accomplishes this by directly appling a stick force in excess of the hydraulic restraints described hereinabove. In so doing, a manual recoupling of the control stick linkage to the power control spools 50, 52 is effected in the following manner.

When the override force exceeds the hydraulic decoupling force, and acts toward the left, for example, as viewed in Fig. 4, piston 175 is forced to the left, thereby displacing fluid back through the valve 174. When an override travel of sufficient distance has been obtained, an override sensor spool 180 is forced to begin to open, causing pressure to rise in the chamber 182 at the right hand end of disengage spool 185 through passageways 144, 145 and 146. As the latter moves toward the left in response to this pressure against a spring 186, a full pressure port 187 is uncovered, which causes spool 185 to be hydraulically locked toward the left. In this position the pressure line 142 to pistons 175, 176 is closed at the same time opening this system to the return line 147 through orifice 188. Thus, a gradual decay of the decoupling force is effected, permitting a smooth transition to the power control (or stability augmentation) mode. To reengage the autopilot, the pilot must first deenergize the solenoid valve 174, permitting spring 186 to restore spool 185 to its original position.

To operate the servomechanism in stability augmentation mode, the solenoid valve 172 is energized with the system oil pressure turned on. The flapper valve 170 is positioned in response to rate gyro signals. For example, if the pressure in the chamber 102 is increased with respect to the pressure in chamber 100, the power spools will be displaced toward the left resulting in actuator travel to the right. The control stick lever 20 will then pivot about point 26 because the friction and inertia, reflected to point 26, required to move the power spools 50, 52 in much less than that represented by the friction and inertia of the control stick and linkage. The actuator follow-up motion causes rod 157 to compress its adjacent spring 159, forcing the power spools 50, 52 toward their closed position.

Equilibrium will thus be reached for a steady rate signal input when the force unbalance of springs 159, 159 is equal and opposite to the pressure force unbalance occuring in chambers 102, 100. Decrease of the rate gyro signal will produce actuator travel in the opposite direction, tending to return it to its original position. The degree of control authority in stability augmentation mode of operation is determined by the spring rate of the members 159, 159 and the maximum differential pressure delivered from the flapper valve 170. Provisions for emergency operation in event of loss of hydraulic pressure may be included in the form of an actuator by-pass valve arrangement as indicated at 190, 192.

Thus, it will be appreciated that by virtue of the present invention a single servomechanism is provided to perform the functions usually accomplished by three separate control mechanisms. In one mode of operation, the device provides a direct power control system with mechanical follow-up so arranged that the pilot's manual control 28 is in effect coupled through linkage 27, 20, 22, 24, 60 and 62, springs 58 and 59, rods 53 and 54 and pins 56 and 57 in Fig. 2 (parts 27, 20, 150, 152, 154, 155, 157, 158 and springs 159 in Fig. 4) to the valve spool 50—52 of a power control valve. Displacement of this valve spool by the pilot's manual control movement causes oil to flow to a hydraulic actuator 77, 78, 80, 82 which supplies the power for moving the aerodynamic control surface 10 against the force of its aerodynamic loading. The interconnected linkage system feeds back in such manner as to null or center the power control valve spool when the control surface actuator has reached the new position called for by the pilot control movement.

The mechanism also provides a means for positioning the control surface in response to electrical input signals from one or more sensing elements. In this auto-pilot operational mode, the valve spools 50 and 52 are normally uncoupled from the pilot's control stick by lockout pistons 106 and 108 (Fig. 2) or 174 and 175 (Fig. 4). The spools and hence the control actuator 77, 78, 80, 82 are thus able to respond in optimum manner to electrical input signals controlling a flapper valve device 85 (Fig. 3) or 170 (Fig. 4); the spools being unrestrained from the inertia and friction of the pilot's stick and linkage. In this mode of operation the pilot control stick is coupled to and follows the movements of the control actuator. This coupling is effective up to a prescribed force beyond which the pilot can override any action of the electrical signal.

The invention also provides a means for positioning a control surface in response to an electrical input signal from an airframe stabilization system. In this stability augmentation mode of operation the stabilizing movements of the actuator and control surface are superimposed upon the pilot's positional input reference through the flapper valve devices, the lockout pistons being retracted as distinguished from the autopilot mode of operation. These stabilizing movements reflect little, if any, force transients back to the pilot's stick. Due to the hydraulic locking characteristics of the system, when in other than manual mode, no aerodynamically induced loads on the control surface are transmitted back to the pilot's control. The electrical input operates the same transfer valve employed for the autopilot control mode discussed hereinabove. The stabilizing link action of the actuator feeds back mechanically to null the power valve spool, and this differential actuator movement is proportional to the amplitude of the electrical input signal. Also, the invention provides a control system functioning as described hereinabove but including means for sensing the pilot's force input at his controls; integrating the force signal; and adding the same to the automatic reference signal as the continuing bias to the reference signal; and may preferably include a means to apply an artificial feel to the pilot's control.

As shown in Figs. 1, 3, mechanical sensors may be employed in lieu of the electrical sensors referred to hereinabove; the output actuators thereof being coupled to the spring 134 by means of linkage indicated at 195.

We claim:

1. In an aircraft control system, a movable flight control device, a member for moving said control device, manual control means adjustable to cause movement of said member, a fluid-pressure actuator connected to said member to motivate the latter, a valve mechanism controlling said actuator comprising a housing enclosing valve means displaceable relative to said housing to control flow of fluid through a primary fluid system to said actuator, said manual control means including a member fulcrumed differentially upon said housing and connected to bias said valve means when said member is unrestrained, said valve mechanism including fluid-pressure responsive means, a pilot valve selectively controlling primary fluid-pressure applications to said valve mechanism, said pilot valve having an armature, electromagnetic means controlling the armature of said pilot valve, mechanical feed back means interconnecting said manual control means and said pilot valve armature to null said pilot valve when said actuator attains a position of response to a control command, a secondary pressure system including a fluid pressure responsive device operable when energized to restrain fulcruming motions of said manual control means on said housing and including a secondary fluid pressure supply source operatively connected to said pressure responsive device and manually controllable to alternately release and block fulcruming of said manual control means relative to said housing, whereby to permit manual control movements to be translated into manually powered movements of said control member, and whereby upon deenergization of said pressure responsive means said manual control will be permitted to displace said valve means to selectively control motivations of said actuator through means of said primary fluid system, and whereby application of differential pressures against said valve mechanism as controlled by said pilot valve will cause displacement of said valve means.

2. In an aircraft control system, a movable flight control device, a member for moving said control device, manual control means adjustable to cause movement of said member, a fluid-pressure actuator connected to said member to motivate the latter, a valve mechanism controlling said actuator comprising a housing enclosing valve means displaceable relative to said housing to control flow of fluid through a primary fluid system to said actuator, said manual control means including a member fulcrumed differentially upon said housing and connected to bias said valve means when said member is unrestrained, said valve mechanism including fluid-pressure responsive means for restraining fulcruming motions of said member, a pilot valve selectively controlling primary fluid pressure applications to said valve mechanism, said pilot valve having an armature, electromagnetic means controlling the armature of said pilot valve, mechanical feed back means interconnecting said manual control means and said pilot valve armature to null said pilot valve when said actuator attains a position of response to a control command.

3. In combination, a device to be moved having an actuating member connected thereto, control means manually manipulatable to cause movement of said member, a fluid-pressure responsive actuater connected to said member to motivate the latter and a servo mechanism for controlling said actuator and comprising a housing enclosing valve means displaceable within said housing to control flow of fluid through a primary fluid system to said actuator, said manual control means including a member fulcrumed upon said housing and connected to said valve means to bias said valve means when said member is unrestrained, a pilot valve selectively controlling primary fluid pressure applications to said valve means, said pilot valve having an armature, automatic stabilization and control means coupled to the armature of said pilot valve for control thereof, and mechanical means operatively interconnecting said actuating member and said pilot valve armature to null the pilot valve when said actuator fulfills a control command.

4. In combination, a device to be moved having an actuating member connected thereto, control means manually manipulatable to cause movement of said member, a fluid-pressure responsive actuator connected to said member to motivate the latter and a servo mechanism for controlling said actuator and comprising a housing enclosing valve means displaceable within said housing to control flow of fluid through a primary fluid system to said actuator, said manual control means including a member fulcrumed upon said housing and connected to said valve means to bias said valve means when said member is unrestrained, a pilot valve having an armature selectively controlling primary fluid-pressure applications to said valve means, automatic stabilization and control means coupled to the armature of said pilot valve for control thereof, and mechanical means operatively interconnecting said actuating member and said pilot valve armature to null the pilot valve when said actuator fulfills a control command, a secondary pressure responsive device adapted to be energized to restrain fulcruming motions of said manual control means on said housing and including a secondary fluid-pressure supply system operatively connected to said pressure responsive device and manually controllable to alternately release and block fulcruming of said manual control means relative to said housing, whereby to permit manual control movements to be translated into manually powered movements of said control surface member, and whereby upon deenergization of said pressure responsive means said manual control means will be permitted to displace said valve means to selectively control motivations of said actuator through means of said primary fluid system and whereby application of differential pressures against said valve means as controlled by said pilot valve will cause displacement of said valve means.

5. In a control system for an aircraft movable control surface, a member for moving said control surface, control means manually adjustable to cause movement of said member, a fluid-pressure actuator connected to said member to motivate the latter in either direction from a neutral position, a valve device controlling said actuator comprising a housing enclosing valve spool means displaceable in opposite directions from a neutral position within said housing to control flow of fluid through a primary fluid system to said actuator, said manual control means including a member fulcrumed differentially upon said housing and upon said valve spool means and connected to bias said valve spool means in either direction away from neutral when said member is unrestrained, said valve spool means including a piston in a fluid pressure chamber which is arranged to apply differential fluid pressures against said piston, a pilot valve selectively controlling primary fluid pressure applications to said chamber, a secondary pressure responsive device adapted to be energized to restrain fulcruming motions of said manual control means on said housing and including a secondary fluid pressure supply system operatively connected to said pressure responsive device and manually controllable to alternately release and block fulcruming of said manual control means relative to said housing, whereby to permit manual control movements to be translated into hydraulically powered movements of said control surface and whereby upon deenergization of said pressure responsive means said manual control will be permitted to displace said valve spool means to selectively control motivations of said actuator through means of said primary fluid system and whereby application of differential pressures against said piston as controlled by said pilot valve will cause displacement of said valve spool means, electromagnetic means responsive to external signals and operable to bias said pilot valve to differentially actuate the valve spool means, and mechanical feed back means actuated by displacements of said fluid-pressure actuator tending to null the pilot valve when said actuator fulfills the commands of said external signals.

6. In a control system for an aircraft movable control surface, a member for moving said control surface, control means manually adjustable to cause movement of said member, a fluid-pressure actuator connected to said member to motivate the latter in either direction from a neutral position, a valve device controlling said actuator comprising a housing enclosing valve spool means displaceable in opposite directions from a neutral position within said housing to control flow of fluid through a primary fluid system to said actuator, said manual control means including a member fulcrumed differentially upon said housing and upon said valve spool means and connected to bias said valve spool means in either direction away from neutral when said member is unrestrained, said valve spool means including a piston in a fluid-pressure chamber which is arranged to apply differential fluid-pressures against said piston, a pilot valve selectively controlling primary fluid pressure applications to said chamber, electromagnetic means responsive to external signals and operable to bias said pilot valve to differentially actuate the valve spool means, and mechanical feed back means actuated by displacements of said fluid-pressure actuator tending to null the pilot valve when said actuator fulfills the commands of said external signals.

(References on following page)

References Cited in the file of this patent

UNITED STATES PATENTS

| | | |
|---|---|---|
| 2,069,540 | Sanford | Feb. 2, 1937 |
| 2,678,177 | Chenery | May 11, 1954 |
| 2,738,772 | Richter | Mar. 20, 1956 |
| 2,755,624 | Klessig | July 24, 1956 |
| 2,773,660 | Rasmussen | Dec. 11, 1956 |
| 2,802,456 | Lance | Aug. 13, 1957 |

FOREIGN PATENTS

| | | |
|---|---|---|
| 1,003,595 | Germany | Feb. 28, 1957 |